United States Patent [19]

Van Erden

[11] Patent Number: 4,947,525

[45] Date of Patent: Aug. 14, 1990

[54] ZIPPER CLOSURE WITH INTERNAL PEEL SEAL

[75] Inventor: Donald L. Van Erden, Wildwood, Ill.

[73] Assignee: Zip-Pak Incorporated, Northbrook, Ill.

[21] Appl. No.: 327,618

[22] Filed: Mar. 23, 1989

[51] Int. Cl.$^5$ ............................................. B65D 77/10
[52] U.S. Cl. .................................... 24/304; 24/305 R; 24/587; 156/66; 206/632; 383/63
[58] Field of Search ............ 24/304, 30.5 R, DIG. 11, 24/587, 400, 399, 389, 384; 493/214; 383/63, 61; 206/632; 156/66

[56] References Cited

U.S. PATENT DOCUMENTS

| | | | |
|---|---|---|---|
| 3,176,364 | 4/1965 | Dritz | 24/304 |
| 3,339,606 | 9/1967 | Kugler | 383/63 |
| 4,354,541 | 10/1982 | Tilman | 156/66 X |
| 4,786,190 | 11/1988 | Van Erden et al. | 383/61 |
| 4,791,710 | 12/1988 | Nocek et al. | 24/587 |
| 4,792,240 | 12/1988 | Ausnit | 24/587 X |

Primary Examiner—James R. Brittain
Attorney, Agent, or Firm—Hill, Van Santen, Steadman & Simpson

[57] ABSTRACT

A flexible continuous reclosable plastic zipper having one strip with a groove and another strip with a rib for interlocking insertion therein, a hot melt plastic peel seal in the base of the groove with the rib bonded to the peel seal material to initially join the rib and groove and with the rib and groove breaking apart away from the bonding material at the first opening and thereafter releasably interlocking in a normal manner with the peel seal material remaining within the groove. The groove is made sufficiently deep so that with initial interlocking, the rib must penetrate to the base of the groove deeper than normal operation to lock to the peel seal. When broken from the peel seal, the rib inserts sufficiently for the jaws of the groove to snap over the rib and then locks without interference from the peel seal which is relatively rigid and nonadhesive after the rib is first broken away.

24 Claims, 1 Drawing Sheet

ZIPPER CLOSURE WITH INTERNAL PEEL SEAL

BACKGROUND OF THE INVENTION

This relates in general to the packaging art, and more particularly is concerned with a continuous reclosable plastic zipper of a type which is used to close the mouth of a bag.

In the use of plastic bags particularly for foodstuffs, it is important to have the bag hermetically sealed until the purchaser acquires the bag and its contents and takes it home and first opens the bag. It is then commercially attractive if the bag is reclosable so that the contents can be protected. Flexible plastic zippers have proven excellent for reclosable bags in that they can be manufactured with high speed equipment and are reliable for repeated reuse. A typical zipper is one which has a groove at one side of the bag mouth and a rib at the other side with the rib interlocking into the groove when the top of the bags are pressed together. Usually, pull flanges extend above the rib and groove strips, which flanges can be pulled apart for access to the bag. Such a fastener is popular, but does not prevent inadvertent or unwelcome opening within the store, and various additions have been made to provide tamper-evident seals which would disclose when the bag was improperly opened prior to purchase.

In spite of the fairly high state of development in this art, there are certain objectives which are still not fully met and there is room for the attainment of simplicity and economy in bags which require hermetic and tamper-evident reclosable closures for mouths of flexible bags.

It is accordingly an object of the present invention to provide a new and improved closure structure suitable for use for closing the mouth of flexible plastic bags which provides a hermetic seal until opened and thereafter affords the advantages and efficiencies of a typical reclosable rib and groove zipper closure.

A further object of the invention is to provide an improved rib and groove reclosable closure of a type particularly well suited for bags containing foodstuffs wherein a hermetic seal and tamper-proof arrangement is substantially integral with the rib and groove thereby reducing the amount of plastic film required for the closure, providing a better appearing, more efficient bag closure.

A still further object of the invention is to provide an improved flexible reclosable plastic zipper which has a unique construction that insures a hermetic seal and tamper-evident closure of the rib and groove until the intentional first opening of the bag and wherein the closure thereafter operates with full efficiency and effectiveness as a pressure reclosable rib and groove zipper closure.

SUMMARY OF THE INVENTION

In accordance with one embodiment of the invention, a pressure reclosable rib and groove structure is employed wherein the groove is provided with more depth than usual and a peel seal lock is provided in the base of the groove which locks the head of the rib in the base. To attain this locking, the head penetrates the groove to its full depth beyond the penetration normally required for interlocking the rib and groove. In accordance with one form of the method, a hot melt plastic bond material is deposited in the base of the groove and the rib pushed down to lock in the hot melt material for the initial joining of the rib and groove fastener strips. This locks the strip together in order to close the top of a bag in a somewhat semi-permanent fashion providing a hermetic seal and a tamper-proof seal.

This peel seal joining holds the top of the bag closed while the bag is being handled and while it is on the store shelves, and it is particularly advantageous for foodstuffs. When the purchaser buys the bag and takes it home, he pulls apart the pull flanges to break the peel seal and at the same time separates the rib and groove for the first access to the contents. Thereafter, the bag functions with the reclosable fastener strips in the normal manner with the rib and groove being joined by pressing them together so that the rib enters the groove and the jaws of the groove lock over the sides of the rib. Reopening is accomplished by pulling apart the pull flanges.

Inasmuch as the peel seal material is integral with the rib and groove strips and coaxial therewith, it is not necessary to provide additional bag film material for the strip to accommodate the tamper-evident and hermetic sealing feature of the closure. The peel seal material is nonadhesive so that once broken apart, the rib will not adhere to it and it provides no function nor impediment to the normal operation of the rib and groove zipper fastener.

While the specification and claims herein will in certain instances refer to a fastener having a rib and groove structure, it will be understood and will be fully appreciated by those versed in the art that the principles of the invention will refer to generic style plastic zipper closures of various designs and not merely to the traditional arrowhead and groove style.

Other objects, advantages and features will become more apparent with the teaching of the principles of the invention in connection with the description of the preferred embodiments in the specification, claims and drawings, in which:

DETAILED DESCRIPTION

Figure 1:
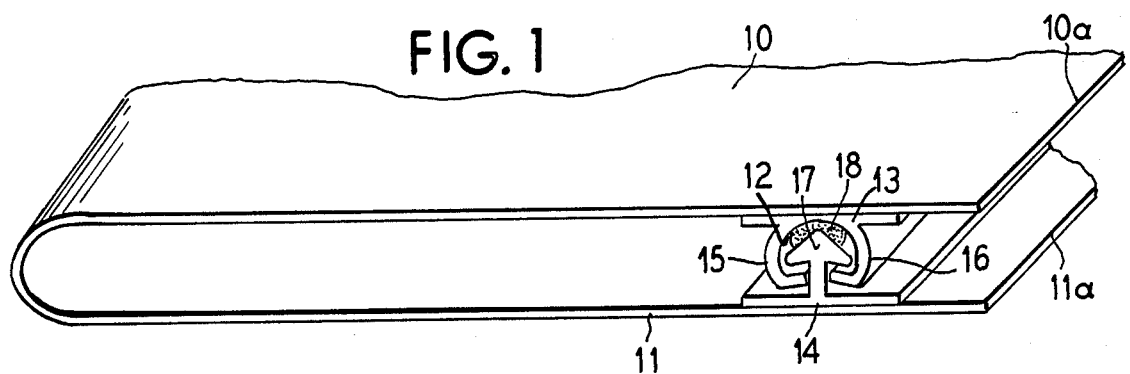
FIG. 1 is a vertical section taken through a bag having a fastener constructed in accordance with the principles of invention.

FIG. 1 illustrates a flexible plastic bag of lightweight polyethylene or the like having a fastener closing the mouth. At the mouth is a groove fastener strip 13 and a rib fastener strip 14 which are shown interlocked. The groove strip has jaws 15 and 16. The rib has an arrowhead shaped head 17 which is interlocked by the flexible jaws 15 and 16. The base of the strips are bonded to the film of the bag. At the top of the bag, pull flanges 10a and 11a are provided by extensions of the side wall film and the pull flanges provide means to pull the rib and groove elements apart to open the bag.

For convenience of description, the zipper is described as the conventional rib and groove wherein an arrowhead shaped rib is received by the locking jaws of a coacting groove member, but it will be understood and appreciated by those versed in the art that certain principles of the invention may apply equally to other modified forms of zipper closure and the reference to the rib and groove is not limiting except to the extent which the principles apply primarily to a rib and groove relationship. The arrowhead rib shown is a preferred arrangement, but the invention is not to be limited to this form of rib. Similarly, it will be fully appreciated that the claims are not limited to the specific form of rib and groove illustrated in the drawings and described herein.

In the base of the groove 12 is a relatively rigid nonadhesive peel seal material 18 which bonds the plastic of the surface of the head 17 to the plastic at the base of the groove 12.

Figure 7:
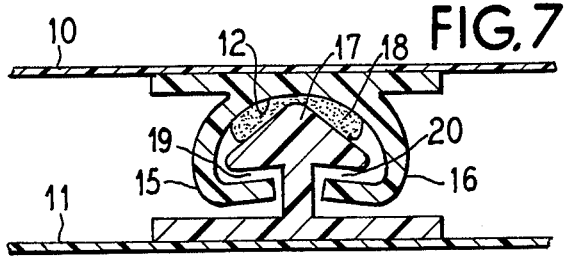
FIG. 7 is a sectional view taken substantially along line VII—VII of FIG. 2 illustrating the relative position of the rib and groove after the rib has been locked in the base of the groove by the peel seal material.

As shown in more detail in the enlarged view of FIG. 7, in the initial locked position between the fastener strips 13 and 14, the rib 17 is bonded to the base of the groove 12 by the peel seal material 18 which forms a bond between the surface of the plastic in the groove and the surface of the plastic of the head.

It will be noted in FIG. 7 that in this bonded position, the head is fully inserted into the groove and that the groove is made deeper than usual so that there are spaces 19 and 20 between the underside of the head 17 and the fingers 15 and 16 of the groove. The reason for this added depth is that when the peel seal is first broken apart and the head is pulled out of the groove, the head is peeled away from the peel seal material 18 and is pulled past the gripping fingers 15 and 16. The fastener thereafter operates as a normal fastener with the head being pressed into the groove so that the fingers 15 and 16 snap over the head.

Actually, the head moves through three positions. In normal interlocked position, the undersides of the head rest against the surfaces of the fingers 15 and 16 which holds the rib in the groove. This is the position of the first insertion depth.

When the rib and groove are to be joined and the rib is pressed into the groove, it must be pressed to a second insertion depth to a location such that the fingers can snap over the base of the head. At a position of the first depth of insertion, the fingers will not have yet cleared the head and they will essentially be at the location illustrated in FIG. 6. This illustrates a second depth of the insertion which is deeper than the first depth.

There is a third depth of insertion which is deeper than the second depth of insertion and that is illustrated in FIGS. 1 and 7. That is the full depth of insertion wherein the head 17 is bonded to the peel seal material 18. When the bag is first opened by pulling outwardly on the flanges 10a and 11a, the rib breaks away from the peel seal material 17 and the peel seal material having been essentially rigid, will still have the appearance that it has in FIG. 7 and will not interfere with the normal interlocking of the rib and groove when the rib and groove are used in the normal fashion.

Figure 2:
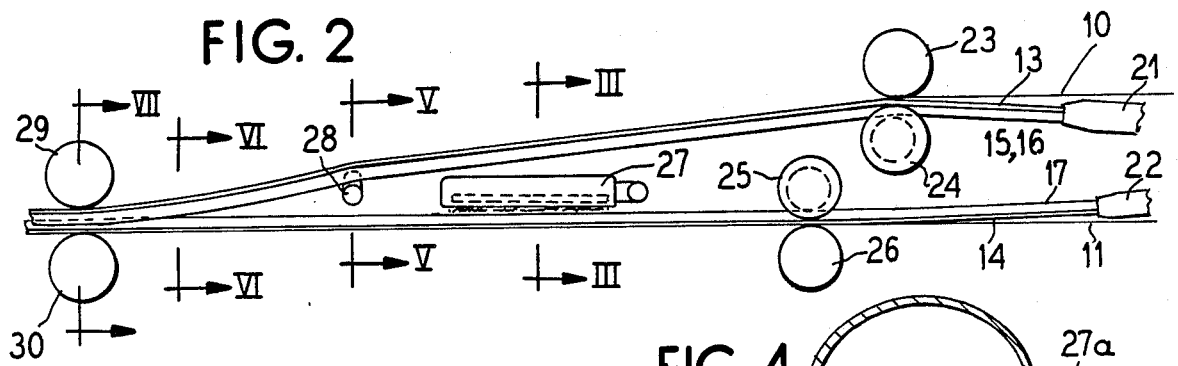
FIG. 2 is a somewhat schematic view illustrating the manner in fastener strips are formed.

FIG. 2 illustrates the initial manufacture or assembly of the structure in accordance with the principles of the present invention. FIG. 2 illustrates the film of the bag being fed forwardly with the upper layer of film 10 and the lower layer of film 11. The fastener strips 13 and 14, being of plastic, are freshly extruded out of extruder dies 21 and 22. Inasmuch as the plastic is somewhat tacky, it will adhere to the surface of the film 10 and 11. As will be recognized by those versed in the art, there are various ways of making the strips and the bag, and the strip and bag can be formed at one time by a single extruder in some methods. Also, the structure of the invention can be manufactured without being immediately assembled onto the film of a bag, and the strips can be made to be used later for assemblage and attachment to the mouth of a bag.

As the strips are fed forwardly, they are pressed onto the film with the upper strip 13 being pressed onto the film by rollers 23 and 24. The lower roller 24 is grooved so that the sides of the base web are pressed onto the film.

The rib strip 14 is pressed onto the film 11 by opposed rollers 25 and 26, with roller 25 being grooved so that the pressure is applied to the side webs of the rib strip 14.

Figure 3:
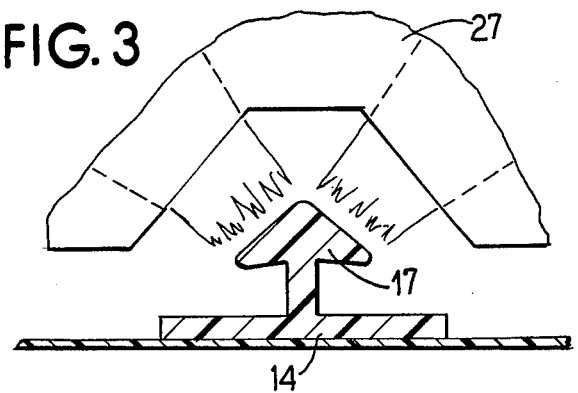
FIG. 3 is an enlarged sectional view taken substantially along line III—III of FIG. 2 illustrating a manner in which surface modification treatment is applied to the rib member.

In FIG. 2, 27 illustrates a surface modification instrument. The purpose of this is to modify the surface of either the rib or the groove so that the peel seal material will be retained on the treated surface when the rib and groove are first pulled apart. FIG. 3 illustrates the element 27 applying a flame treatment to the surface of the rib 17. This flame treatment will modify the surface so that the peel seal material will adhere more firmly to the rib than it will to the material of the groove. Then when the rib and groove are first pulled apart, the peel seal material will stay with the rib in the manner illustrated in FIG. 8. A preferred arrangement, however, is to modify the surface at the base of the groove 12 so that the peel seal material will remain with the groove rather than the rib. This permits the rib to retain its original arrowhead shape which makes it enter the groove more easily when the two are pressed together.

Figure 4:
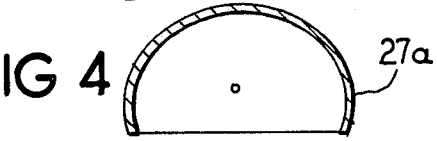
FIG. 4 is a cross-sectional view illustrating another manner in which surface modification treatment is applied to the rib member.

Another arrangement for modifying the surface of the rib is shown at 27a in FIG. 4. This is a corona discharge element which modifies the surface so that the peel seal material will adhere to it.

The flame treating is the method of rendering inert thermoplastics, such as the polyolefins, to be receptive to other materials by bathing the surface in a highly oxidizing flame. This treatment oxidizes or modifies the surface layer of the head or of the groove, whichever the case may be, making it particularly receptive to the peel seal material The corona discharge treatment is a method of rendering plastics, such as polyolefins, receptive to material such as the peel seal material. A typical method is to pass the surface over a grounded metal cylinder above which is located a sharp edged high voltage electrode spaced as to leave a small air gap between the plastic and electrode. The corona discharge oxidizes the film by means of the formation of polar groups on reactive sites making the surface receptive to the peel seal material.

Figure 5:
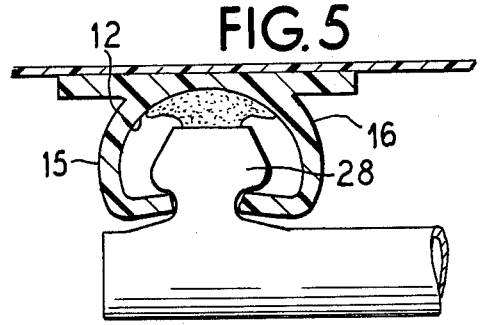
FIG. 5 is a sectional view substantially along line V—V of FIG. 2.
Figure 6:
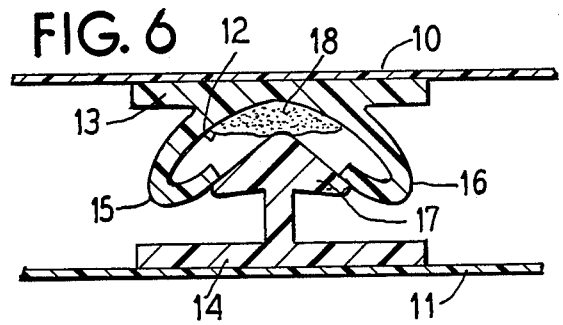
FIG. 6 is an enlarged sectional view taken substantially along line VI—VI of FIG. 2 illustrating the manner in which the rib and groove elements are initially interlocked being secured by the peel seal material as they are joined by the method illustrated in FIG. 2.

Following the surface modification treatment by the members 27 or 27a, the peel seal material is discharged onto the fastener profile by an extruder 28. In a preferred arrangement, the material is discharged into the groove as illustrated in the detail in FIG. 5. Where a hot melt peel seal material is used and deposited into the groove, the rib is pressed into the hot melt material as shown in the sequence of FIGS. 6 and 7, and as the hot melt peel seal material 18 cools, a hermetic seal bond is formed essentially bonding the surface of the head 17 of the rib to the peel seal material and bonding the surface of the groove 12 to the peel seal material.

Then when the bag is first opened, the bond is broken pulling the head away from the peel seal material.

Figure 8:
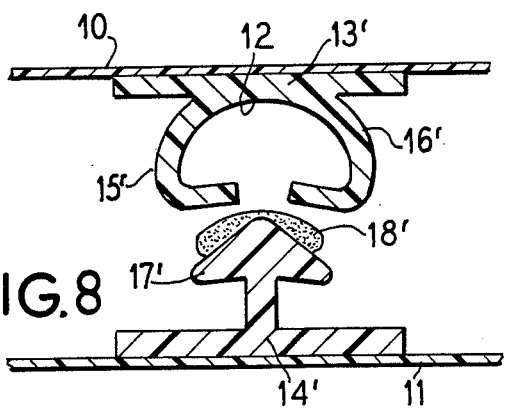
FIG. 8 is a sectional view illustrating another form of the invention where the peel seal material is attached to the rib instead of to the groove.

In the illustration of FIG. 8, the peel seal material has been added to the head so that when the rib and groove are separated, the peel seal material will separate from the surface of the groove 12 rather than from the head. In FIG. 8 the groove strip is shown at 13' with its jaws 15' and 16'. The strip 14' has a head 17' on which the peel seal material 18' is bonded. Assurance that the peel seal material will continue to adhere to the surface desired is achieved by surface modification by the flame treatment or corona discharge treatment illustrated in FIGS. 3 and 4.

In operation, the structure is shown in FIG. 7 initially as the head 17 is bonded to peel seal material which is bonded to the inner surface of the groove 12. This provides a hermetic seal and a semi-permanent junction which is tamper-evident if pulled apart prior to the time the purchaser desires to open the bag. Once the bag is purchased and the bag opened by a strong pull on the pull flaps 10a and 11a, the head moves out of its fully inserted position leaving the peel seal material behind with a groove which does not interfere with the normal operation of the rib and groove. Then when the bag is to be reclosed, the head 17 is pressed into the groove to the second deepest position where the jaws or fingers 15 and 16 snap behind the head, and the head is locked within the groove until the strips are separated by pulling apart on the pull flanges 10a and 11a.

I claim as my invention:

1. A flexible continuous reclosable plastic zipper, comprising in combination:
    a female member having a groove and locking jaw means;
    a male member having a rib for insertion into the groove and being locked therein by said jaw means at a first insertion depth of the rib into the groove;
    said jaw means moving to a gripping position when the rib is inserted into the groove to a second insertion depth deeper than said first depth;
    and a peel seal joining bond material between the rib and groove bonding the rib into the groove at a third over-closed insertion depth at least equal to said second depth;
    one of said rib and groove breaking from the peel seal bond material upon first separation of the rib and groove with the bond material remaining nonadhesive and permitting normal interlocking of the rib and groove after first breaking from the bond material.

2. A flexible continuous reclosable plastic zipper constructed in accordance with claim 1:
    wherein said bond material is located centrally between the rib and base.

3. A flexible continuous reclosable plastic zipper constructed in accordance with claim 1:
    wherein said bond material remains in the base of the groove with the rib breaking from the bond material when the rib and groove are first broken apart.

4. A flexible continuous reclosable plastic zipper constructed in accordance with claim 1:
    wherein said bond material remains on the rib and breaks out of the groove when said rib and groove are first broken apart.

5. A flexible continuous reclosable plastic zipper constructed in accordance with claim 1:
    wherein said bond material is a heated thermoplastic with the rib and groove joined while the thermoplastic is adhesive.

6. A flexible continuous reclosable plastic zipper constructed in accordance with claim 1:
    wherein one of said rib and groove is surface modified prior to joining so that the surface modified surface will not break from the bond material and the bond material will stay with the modified surface.

7. A flexible continuous reclosable plastic zipper constructed in accordance with claim 1:
    wherein said rib is surface modified prior to joining so that only the groove will break from the bond material.

8. A flexible continuous reclosable plastic zipper constructed in accordance with claim 1:
    wherein the groove is surface modified prior to joining so that the bond material will not break from the groove and will break from the rib.

9. A flexible continuous reclosable plastic zipper constructed in accordance with claim 1:
    wherein the locking jaw means is in the form of double jaws which snap over the rib at said second insertion depth.

10. A flexible continuous reclosable plastic zipper constructed in accordance with claim 1:
    wherein one of said rib and groove is flame treated prior to joining to insure that the bond material will adhere to the flame treated surface when the rib and groove are first broken apart.

11. A flexible continuous reclosable plastic zipper constructed in accordance with claim 1:
    wherein one of said rib and groove is treated with a corona discharge prior to joining to insure that the bond material will adhere to the corona discharge treated surface when the rib and groove are broken apart.

12. A flexible continuous reclosable plastic zipper, comprising in combination:
    a female member having a groove;
    a male member having a rib for insertion into the groove and being locked therein when the members are pressed together;
    and a nonreusable closure means between the rib and groove capable of holding the male and female together and capable of being broken apart with the application of a pull-apart force applied to the rib and groove members;
    the rib and groove releasably interlocking normally after breaking of the nonreusable closure means.

13. A flexible continuous reclosable plastic zipper constructed in accordance with claim 12:
    wherein said nonreclosable closure means is a peel seal.

14. A flexible continuous reclosable plastic zipper constructed in accordance with claim 12:
wherein said nonreclosable closure means is a heat bond thermoplastic.

15. A flexible continuous reclosable plastic zipper constructed in accordance with claim 12:
wherein said nonreclosable closure means is located at the base of the groove and at the tip of the rib.

16. A flexible continuous reclosable plastic zipper constructed in accordance with claim 12:
wherein the nonreclosable closure means is a peel seal material in the base of the groove and one of the surfaces between the rib and groove has been surface modified so that the peel seal will remain attached to the modified surface.

17. A flexible continuous reclosable plastic zipper constructed in accordance with claim 12:
wherein the nonreclosable closure means forms a hermetic seal between the rib and groove.

18. A flexible continuous reclosable plastic zipper, comprising in combination:
a female member having a groove;
a male member having a rib for insertion into the groove and being interlocked into the groove in normal interlocking relationship;
the rib and groove having interlocking means therebetween holding the rib in place in the groove in said normal interlocking relationship;
and a relatively hard bonding material between the rib and groove initially bonding the rib into the grooves, said material being non-adhesive after being broken;
said rib and groove breaking the bonding material upon forcible separation;
said rib and groove interlocking in said normal interlocking relationship after breaking from the bonding material.

19. The method of forming opposed closure strips capable of forming a seal for the mouth of a bag, comprising the steps:
forming a flexible plastic strip with a groove therein;
forming a coacting flexible plastic strip with a rib thereon, said rib and groove shaped to interlock when pressed together;
and positioning a peel sand bond between said rib and groove joining the rib in the groove;
said peel seal bond breaking as the rib and groove are first pulled apart, said peel seal being nonadhesive after being broken;
said rib and groove interlocking normally when pressed together or releasing when pulled apart after first breaking the peel seal bond.

20. The method of forming a closure strip capable of forming a seal for the mouth of a bag in accordance with the steps of claim 19:
including extruding said peel seal bond into the base of the groove.

21. The method of forming a closure strip capable of forming a seal for the mouth of a bag in accordance with the steps of claim 19:
including extruding said peel seal bond onto the rib.

22. The method of forming a closure strip capable of forming a seal for the mouth of a bag in accordance with the steps of claim 19:
including extruding a hot melt material between the rib and groove prior to joining and bonding the rib and groove to the hot melt thermoplastic.

23. The method of forming a closure strip capable of forming a seal for the mouth of a bag in accordance with the steps of claim 19:
including surface treating the base of the groove to insure a permanent joining between the peel seal bond and the groove so that the rib will break from the peel seal when the strips are pulled apart.

24. The method of forming a closure strip capable of forming a seal for the mouth of a bag in accordance with the steps of claim 19:
including surface treating the crown of the rib to insure that the peel seal bond will permanently adhere to the rib and the peel seal material will break from the base of the groove when the strips are first pulled apart.

* * * * *